(12) United States Patent
Krause et al.

(10) Patent No.: US 9,415,509 B2
(45) Date of Patent: Aug. 16, 2016

(54) ROBOT TEACH DEVICE WITH 3-D DISPLAY

(71) Applicant: FANUC ROBOTICS AMERICA CORPORATION, Rochester Hills, MI (US)

(72) Inventors: Kenneth W. Krause, Rochester Hills, MI (US); Bradley O. Niederquell, Troy, MI (US); Gordon Geheb, Hartland, MI (US); Ganesh Kalbavi, Rochester, MI (US); Claude Dinsmoor, Rochester Hills, MI (US); Scott M. Dreslinski, Rochester Hills, MI (US); Charles R. Strybis, Rochester Hills, MI (US); H. Dean McGee, Rochester Hills, MI (US); Glenn Nowak, Rochester Hills, MI (US); Judy Evans, Oakland, MI (US); Rick E. Wunderlich, Canton, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 123 days.

(21) Appl. No.: 13/667,348

(22) Filed: Nov. 2, 2012

(65) Prior Publication Data

US 2013/0116828 A1 May 9, 2013

Related U.S. Application Data

(60) Provisional application No. 61/555,675, filed on Nov. 4, 2011.

(51) Int. Cl.
*G06T 15/00* (2011.01)
*B25J 9/16* (2006.01)
*G05B 19/409* (2006.01)

(52) U.S. Cl.
CPC ............. *B25J 9/1605* (2013.01); *G05B 19/409* (2013.01); *G05B 2219/35318* (2013.01); *G05B 2219/39449* (2013.01)

(58) Field of Classification Search
CPC ................... B25J 9/1605; G05B 2219/39449; G05B 2219/35318; G05B 19/409
USPC .................... 345/419; 700/264, 254; 382/141
See application file for complete search history.

(56) References Cited

U.S. PATENT DOCUMENTS

| 5,937,143 | A | 8/1999 | Watanabe et al. |
| 6,167,328 | A | 12/2000 | Takaoka et al. |
| 7,126,723 | B1 * | 10/2006 | Yamamoto ..................... 358/3.3 |
| 7,151,848 | B1 * | 12/2006 | Watanabe et al. ............. 382/141 |

(Continued)

FOREIGN PATENT DOCUMENTS

| JP | 62-043706 | 2/1987 |
| JP | 09-146753 | 6/1997 |

(Continued)

*Primary Examiner* — Phu K Nguyen
(74) *Attorney, Agent, or Firm* — Fraser Clemens Martin & Miller LLC; William J. Clemens

(57) ABSTRACT

A method and an apparatus for displaying three-dimensional workcell data includes a hand-held pendant that is provided with 3-D workcell data representing a model of a machine and associated components in a workcell. The hand-held pendant has a display that generates a 3-D visual representation of the workcell data. The pendant can be operated by a user to manipulate the visual representation to change a user viewpoint and to show motion of the machine with associated process information.

18 Claims, 3 Drawing Sheets

(56) References Cited

U.S. PATENT DOCUMENTS

| | | | |
|---|---|---|---|
| 7,164,971 B2 * | 1/2007 | Ferla et al. | 700/264 |
| 7,346,478 B2 * | 3/2008 | Walacavage et al. | 703/7 |
| 7,643,907 B2 * | 1/2010 | Fuhlbrigge et al. | 700/264 |
| 7,945,349 B2 * | 5/2011 | Svensson et al. | 700/254 |
| 7,970,492 B2 * | 6/2011 | Matsushima et al. | 700/246 |
| 8,271,134 B2 * | 9/2012 | Kato et al. | 700/253 |
| 8,396,599 B2 * | 3/2013 | Matsuo et al. | 700/264 |
| 2005/0285854 A1 | 12/2005 | Morita et al. | |
| 2006/0181527 A1 | 8/2006 | England et al. | |
| 2007/0167702 A1 | 7/2007 | Hasser et al. | |
| 2009/0204257 A1 | 8/2009 | Landsnes | |
| 2011/0311127 A1 | 12/2011 | Mizutani et al. | |

FOREIGN PATENT DOCUMENTS

| | | |
|---|---|---|
| JP | 2006-142480 | 8/2006 |
| JP | 2010-042466 | 2/2010 |
| JP | 2011-065399 | 3/2011 |

* cited by examiner

ROBOT TEACH DEVICE WITH 3-D DISPLAY

CROSS-REFERENCE TO RELATED APPLICATION

This application claims the benefit of U.S. provisional patent application Ser. No. 61/555,675 filed Nov. 4, 2011.

FIELD OF THE INVENTION

This invention relates to displaying robot and program specific data on a robot teach device with three-dimensional images.

BACKGROUND OF THE INVENTION

Prior art methods and devices displaying robot and program specific data include the offline simulation software, running on a personal computer (PC), and the use of offline programming/simulation systems on a PC or other non-attached programming device.

Currently, a high powered personal computer is required to render a three-dimensional workcell data as a high quality three-dimensional image. Additionally, a customized programming code (e.g. C programming language) is required for each display device. Accordingly, to enable a particular device (e.g. computer) to display the three-dimensional image of a workcell, the particular device must include a customized software program.

U.S. Pat. No. 5,937,143 is an example of using a robot teaching pendant to display images of a robot tool, tool coordinates in a tool coordinate system and the taught points in a user or world coordinate system. However, this pendant is directed to displaying 3-D data from robot programs in a 2-D format on the pendant screen. U.S. published application 2005/0285854 and U.S. published application 2007/0167702 are examples of systems that require a workstation to generate a real-time 3-D image. U.S. Pat. No. 6,167,328 and U.S. published application 2009/0204257 show teach pendants for generating simple 3-D graphical displays of a taught path for a robot. Thus, prior art teach pendants do not generate high quality 3-D images of a robotic workcell that can be manipulated.

Typically, an operator of a robot is required to access a dedicated computer to be able to visualize the location of non-visible parameters that constrain the operation or travel of the robot, such as Safety zones and interference regions. Therefore, the three-dimensional image of the workcell is not readily available in the hands of an operator of a robot.

The prior art also requires a programmer/operator understand esoteric math concepts such as how a specific angle relates to an angle of robotic tooling and to other elements in three space. For a physical position the operator can see the physical machine and program a point according to the physical positions. However there are more virtual special relationships which the operator cannot see with the prior art devices. Elements such as safety walls, the robot envelope, areas where robots overlap operating zones for particular operations are difficult to visualize without a three-dimensional model. The operator must be very experienced in order to relate the text describing these elements to the physical world.

The prior art for jogging a robot requires an experienced operator who knows how the jog buttons map to the physical world. The operator is typically required to mentally visualize a resultant outcome in response to engaging a particular key. However, even an experienced operator occasionally engages an undesired key, which can result in damage to the robot and surrounding equipment. For specific applications such as arc welding, the operator must be familiar with specific terms such as lead and lag angle, which are not obvious from the textual information traditionally provided.

The prior art has the following shortcomings:
1. Simulation of the robot is not directly connected to execution of the robot.
2. Features are limited since they are based on established simulation and ideas from the CAD-CAM environment.
3. High quality three-dimensional (3-D) images that can be manipulated are not available on the hand held pendant associated with the robot; such images normally require a large display and a PC or other advanced computing device to operate.

SUMMARY OF THE INVENTION

Concordant and consistent with the invention, a system and a method for displaying a three-dimensional representation of three-dimensional graphical data in a robotic environment overcomes the shortcomings of the prior art as follows.

According to the invention, the display of robot and program specific data is directly connected to execution of the robot; not a simulation, but reflecting real robot data, updated or rendered real time to the execution of the robot. New features for the display of information specific to the robot and execution of the robot program in a graphical fashion are provided on a handheld device. New navigation features that tie graphical features to the execution of the robot program are available. New graphical features tying process information to graphical representation of the robot and robot path execution are provided. New methods to prepare workcell information from offline simulation system into graphical information for display on the robot pendant are available.

A method according to the invention for displaying three-dimensional workcell data comprises the steps of: providing from a data source 3-D workcell data representing a model of a machine and associated components in a workcell; providing a hand-held display device and placing the display device in data communication with the data source; communicating the workcell data from the data source to the display device; generating a 3-D visual representation of the workcell data on the display device; and operating the display device to manipulate the visual representation.

A hand-held pendant according to the invention for communicating with a robot controller comprises: a display having a resolution high enough to show 3-D graphical images; an input/output port for receiving from a data source 3-D workcell data representing a model of a robot and associated components in a workcell; a data storage device for storing the 3-D workcell data and a pendant operating program; and a processor connected to the display, the input/output port, and the data storage device for running the operating program to generate a 3-D visual representation of the workcell data on the display and being responsive to user input to manipulate the visual representation.

DESCRIPTION OF THE DRAWINGS

The above as well as other advantages of the present invention will become readily apparent to those skilled in the art from the following detailed description of a preferred embodiment when considered in the light of the accompanying drawings in which.

DETAILED DESCRIPTION OF THE INVENTION

The U.S. provisional patent application Ser. No. 61/555,675 filed Nov. 4, 2011 is incorporated herein by reference and is identified below as the "'675 provisional".

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
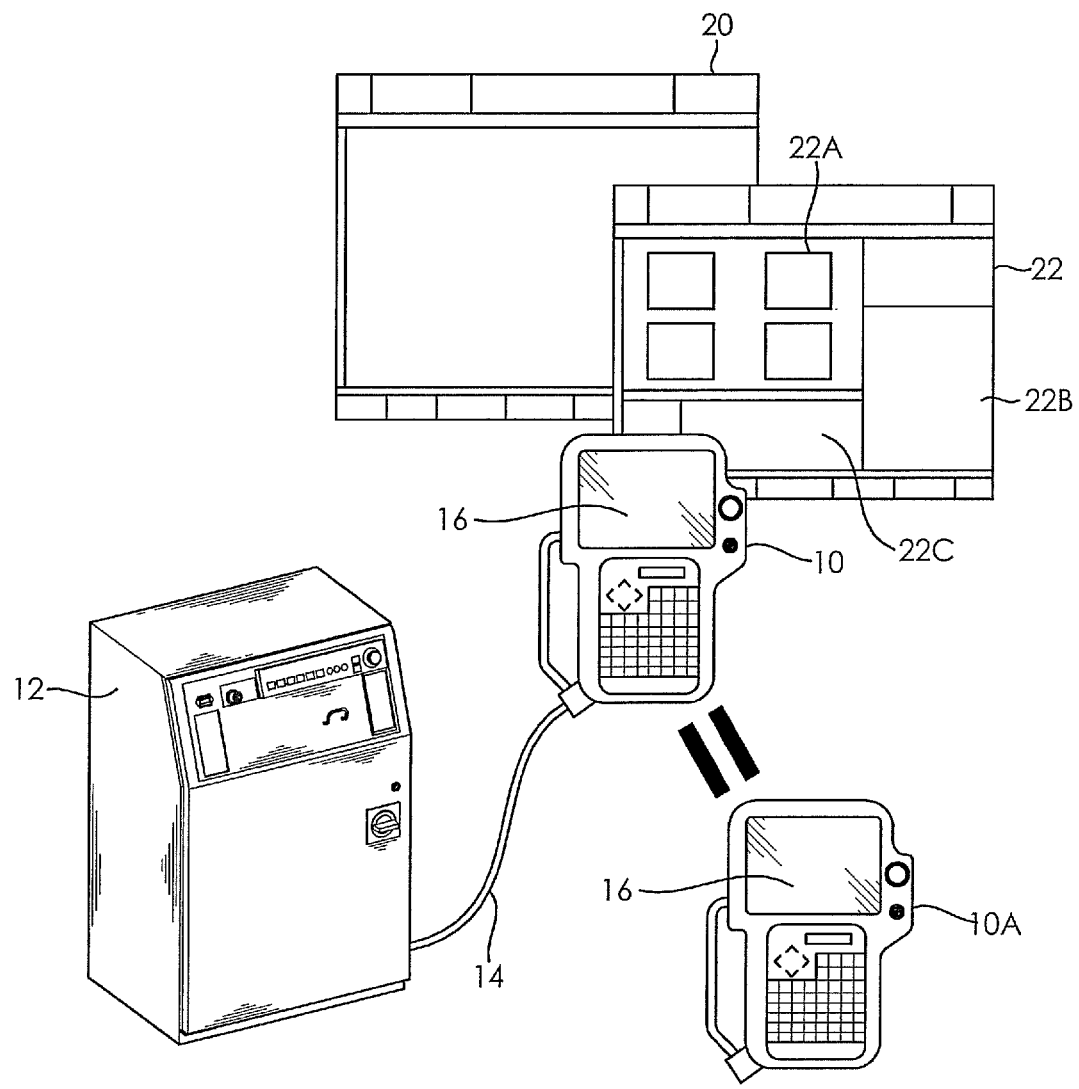
FIG. 1 is a perspective view of two embodiments of a robot pendant according to the invention communicating with a robot controller.

There is shown in FIG. 1 a robot pendant 10 according to the invention communicating with a robot controller 12 via a cable 14 providing an Ethernet local area network connection. The Ethernet connection can be, for example, a 100Base-X (or Fast Ethernet) that supports data transfer rates of 100 Mbps. An alternate version robot pendant 10a communicates with the controller 12 via WIFI wireless transmission. However, any suitable high speed interface can be used to exchange data between the pendant and the controller. The Internet-ready teach pendant unit allows users to browse the information available on the Internet/Intranet. Users can also customize robot information displayed on the teach pendant unit.

Each of the pendants 10 and 10a has a display 16. The display 16 is capable of showing a user at least simple shaded 3-D graphics and includes touchscreen functions. For example, the display 16 can have a resolution of 600×800. As shown, a full screen 3-D image 20 of a robot to be controlled from the pendant 10 or 10a can be generated from the display 16. Another image 22 that can be generated has a first area 22a showing four live video images received from cameras viewing a tool attached to the robot and/or a part being processed by the robot. The image 22 includes a second area 22b extending vertically along a right side of the display 16 showing vision tools and vision process information. The image 22 further includes a third area 22c extending horizontally below the first area 22a for showing data representing camera view results. The image 20 is representative of the capability of the pendants 10 and 10a to generate simple shaded 3-D graphics images. The image 22 is representative of the capability of the pendants 10 and 10a to generate complex pages including vision images, especially live video, and significant quantities of information regarding the operation of an associated robot. Thus, the pendants 10 and 10a eliminate the need to use a PC for robot setup.

The pendants 10 and 10a provide a 3-D interface for applications running on the controller 12 to use. Functions on the controller call on higher level functions on the pendant to display "primitives". These are higher level geometries like spheres and boxes.

Another extremely important function supported by the pendants 10 and 10a is the ability to load graphics files. The pendant operating system provides a mechanism to load these files. This allows the application to change the position, color or visibility of each named element for example. The system stores the application defined shapes into the 3-D world data base. This data base is used to provide access for painting and positioning of all defined elements.

The system provides a means to view the 3-D data base from different viewpoints. It also provides a means to make objects visible or not depending the view. For example, in a dual mode the user may view PROGA (program A) from the left window and PROGB (program B) from the right window. Both programs are in the single data base but only one is visible in each window.

Figure 2:
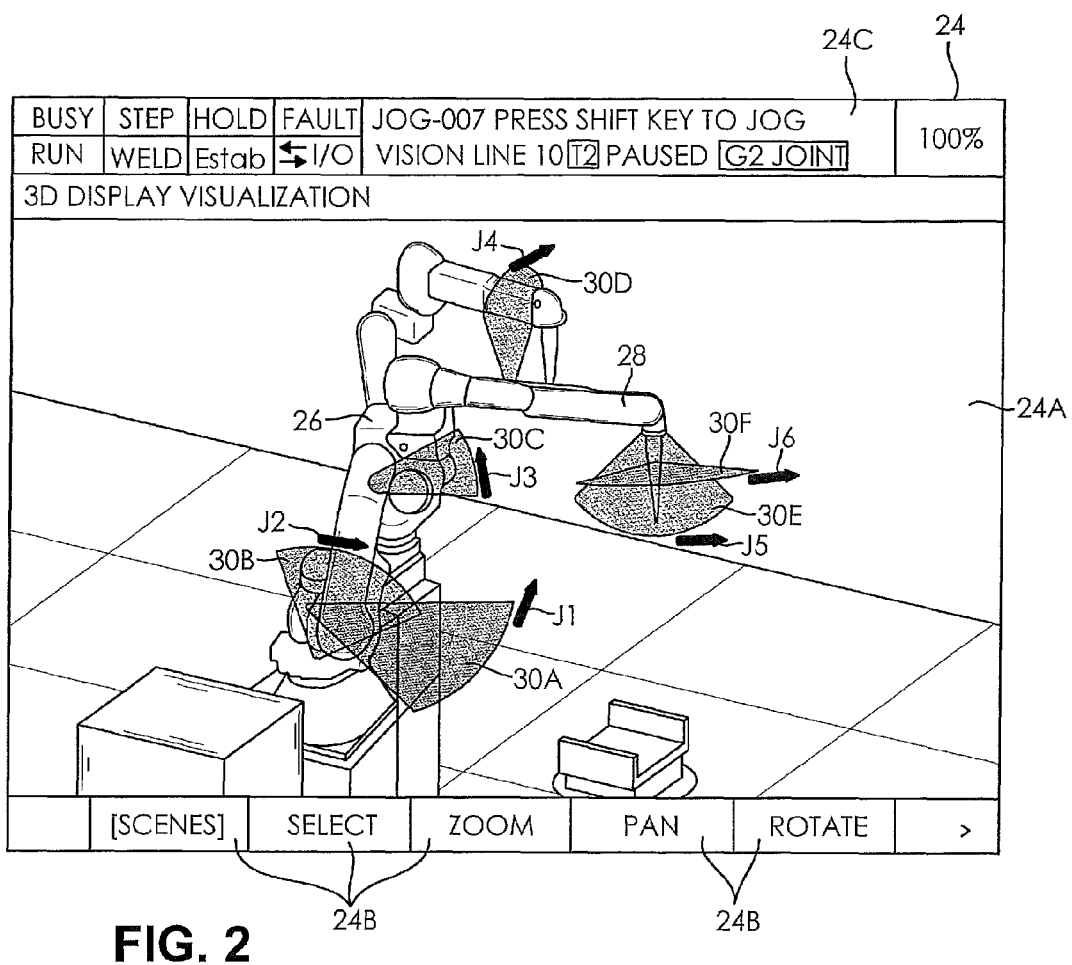
FIG. 2 is schematic representation of a 3-D image generated by the pendants shown in FIG. 1.

There is shown in FIG. 2 an image 24 that is generated by the pendants 10 and 10a on the display 16. The image 24 has a full width central area 24a showing a 3-D representation of a robot 26 that is connected to the pendant through the controller 12 of FIG. 1. The image 24 has a plurality of soft keys 24c positioned along a bottom edge and enabled by the touchscreen functions of the pendant. As an example, [SCENES], SELECT, ZOOM, PAN and ROTATE soft keys are shown. The robot 26 includes an arm 28 that can rotate about six axes J1 through J6. As an aid in such tasks as training, diagnostics, setup and editing, the pendants 10 and 10a generate representations 30a through 30f of movement of the arm 28 about the axes J1 through J6 respectively. Each of the representations 30a through 30f depicts movement of an associated part of the robot 26 in a plane transverse to the associated axis of rotation and can include an arrow to indicate a direction of movement.

A 3-D scene consists of a view point and a set of visible items. Scenes are set up at three different levels:
1. Pre-set scenes have logical combinations of items.
2. Application scenes are created by the application. For example, a picking application might display neighboring robots or the whole cell depending on the scene.
3. The user can record a scene after setting up visibilities and a viewpoint and then attach a name to that scene.

It is typical that a user will adjust the view as he/she works within the scene. This view is associated with the scene and will be used whenever the scene is displayed. So even though the user does not "record" a scene from a different view the adjusted view is always used and that view is stored with the scene. A scene menu can be a prompt box which contains options to record, default and delete scenes. The scene menu can be displayed by actuating the [SCENES] soft key 24b shown in FIG. 2. As an alternative to the prompt box, the user is able to select the scene based on a thumbnail of the displayed 3-D graphics.

The system and method of the present invention provide a means to display a representation of a three-dimensional workcell data on a hand-held robot pendant. Accordingly, the three-dimensional workcell data can be utilized by any user of the pendant. Therefore, a user can have access to reliable three-dimensional displays as an aid to teaching and maintaining a robot.

The method and device according to the present invention provide the various features and advantages as described in the following. As set forth in paragraph [0014] and the associated display image of the '675 provisional, the pendants 10 and 10a show a TCP (tool center point) trace as the path of the robot through a program in 3-D.

As set forth in paragraph [0015] and the associated display image of the '675 provisional, the pendants 10 and 10a show a position register visualization displaying the robot position based on the value of a program or non-program representation of the robot position within the software.

As set forth in paragraph [0016] and the associated display image of the '675 provisional, the pendants 10 and 10a show a jog visualization display in a graphical fashion of the direction the robot will take if moved using the jog keys of the pendant or other user interface device. This image corresponds to the image 24 described above.

As set forth in paragraph [0017] and the associated display image of the '675 provisional, the pendants 10 and 10a show an alarm visualization display to show graphically the occurrence of events in the operation of the robot relative to the position of the robot in space.

As set forth in paragraph [0018] and the associated display image of the '675 provisional, the pendants 10 and 10a show an interference visualization image of the aggregate space occupied by a robot throughout execution of at least a portion of a program resident on the controller 12. The aggregate space is determined by the space occupied throughout execution of all programs resident on the controller. The method of display includes the visualization of multiple robots. The visualization is provided for the intersection of the aggregate occupied spaces. Color and transparency are used to differentiate various visualized elements. The visualization of spaces includes surfaces representing boundaries of permitted robot motion. The boundaries permit entry of only one robot of the multiple robots. Color and transparency are used to identify the robot which has permitted entry.

As set forth in paragraph [0019] and the associated display image of the '675 provisional, the pendants 10 and 10a show a weld procedure visualization image showing graphically process data and relating the process data to the graphical representation of the robot. The method and apparatus according to the invention select data on the graphical representation of the robot and relate it to the graphical representation of the data. The method and apparatus also select data on the graphical representation of the data and relate it to the graphical representation of the robot.

As set forth in paragraph [0020] and the associated display image of the '675 provisional, the pendants 10 and 10a show a graphical display of process conditions over a TCP trace. The method according to the invention plots process information in conjunction with the TCP trace of the robot program.

As set forth in paragraph [0021] and the associated display image of the '675 provisional, the pendants 10 and 10a show a process boundary visualization image. The method according to the invention displays graphically the non-visible area associated with the parameters of a region for restricting or limiting the travel of a robot during a robot operation and/or the vision system queue processing boundaries.

The method and apparatus according to the invention use the vision camera view and live camera data in conjunction with the 3-D world. The method shows the view point of a camera in the 3-D workcell model, with display of images from live or previously acquired camera information. See the first area 22a in FIG. 1.

The method and apparatus according to the invention tie features in the graphical representation to menus within the overall system. For example, in a welding application, when the user selects the torch the pendant takes the user to an arc setup page. The method uses features within the graphical representation of the robot/robot cell to change the display to a menu or selection page on the robot pendants 10 and 10a.

The method and apparatus according to the invention coordinates 3-D position data to a chart of process data and robot program information to play back offline or on another robot. The method involves tying a 3-D representation of the robot position to a graph of secondary information. The method collects a series of the robot positions and secondary information and replays the progression of the information on the display 16 of the teach pendants 10 and 10a or a second display device.

The pendants 10 and 10a provide "touch and hold" or "double click" for alternate function operation. The user touches a displayed instruction to bring up a picture or model of the process equipment showing where the value is set and what it relates to within the process. The method also provides for selecting an alternate function by pressing and holding on the 3-D item of interest or double clicking on the item of interest on the display of the pendant.

The method and apparatus according to the invention uses a graphical method of selecting visually the programs stored within the robot controller 12, or connected storage devices, and previewing the node map of the robot allowing easy selection from the graphic environment. The method shows the graphical representation of the positions contained within a robot program to aid in the selection of the program for execution by the robot.

The pendants 10 and 10a provide offline graphics development for the construction and use of an offline robot simulation cell information in the 3-D graphical environment. The method constructs the graphical cell information for display on the pendant 10 and 10a, and for transmission of this data to the robot.

The method and apparatus according to the invention provide the capability for modeling items within the 3-D world on the pendants 10 and 10a. The method constructs cell components for display within the graphical representation structure.

The method and apparatus according to the invention provide the capability of simulation of the graphics model of the cell and tying visualization to physical items (like an i/o point). The method shows events tied to actual events to changes in the graphical representation displayed on the teach pendants 10 and 10a or other display devices.

The method and apparatus according to the invention provide the capability of offline construction of the machine tied to the operation of the robot program (I/O point change the view of the modeled components). The method can develop the graphical representation on a device other than the robot.

The method and apparatus according to the invention provide the capability of showing the progression of a part through the modeling environment on the pendant tied to the actual operation of the cell and offline or online setup to match physical cell. The method shows movement of elements of graphical representation tied to movement or changes within the robot on the teach pendants 10 and 10a.

The method and apparatus according to the invention provide the capability of showing the operation of the process tied to the physical process on the robot (example: show arc spark when robot is welding). The method selects a 3-D element and indicates or displays a corresponding 2-D item such as a text item.

As set forth in paragraph [0033] and the associated display image of the '675 provisional, the pendants 10 and 10a show a node map. The method generates a graphical representation of the programmed or actual path of the robot or robot program on the pendant of the robot.

The method and apparatus according to the invention provide the capability of selecting a 2-D item such as a text item and indicating or displaying a corresponding 3-D element on the pendants 10 and 10a.

The method and apparatus according to the invention provide the capability of selecting and manipulating the user viewpoint or the 3-D rendering.

The method and apparatus according to the invention provide the capability of displaying menus or other robot text data such as programs in a semi-transparent window with the 3-D elements visible below. The method and apparatus according to the invention provide the capability of manipulating the transparency of text from invisible to opaque via any of the input means when the 3-D rendering provides the background for the text. The method and apparatus according to the invention provide the capability of selecting a menu action from a semi-transparent sprite overlayed on a 3-D rendering to provide a 2-D menu overlay on the 3-D image.

The method and apparatus according to the invention provide the capability of selecting a group of 3-D elements and indicating or displaying the corresponding 2-D items such as program points. The method and apparatus according to the invention provide the capability of selecting a group of 2-D items such as program points and indicating or displaying the corresponding 3-D elements.

The method and apparatus according to the invention provide the capability of displaying multiple views of the 3-D world on the teaching device at the same time. This could be a split screen or picture-in-picture.

As set forth in paragraph [0042] and the associated display image of the '675 provisional, the pendants 10 and 10a provide the capability of showing a graphical display of robot dependent data over a TCP Trace. The method according to the invention plots robot dependent data such as speed and acceleration information in conjunction with the TCP trace of the robot program.

The method and apparatus according to the invention provide the capability of presenting different images to each eye of the user or the same image to each eye. The method presents different images to each eye for "true" 3-D view like a 3-D movie. When the method presents the same image to both eyes, it is a 3-D rendering as in a traditional CAD/CAM image.

Figure 3:
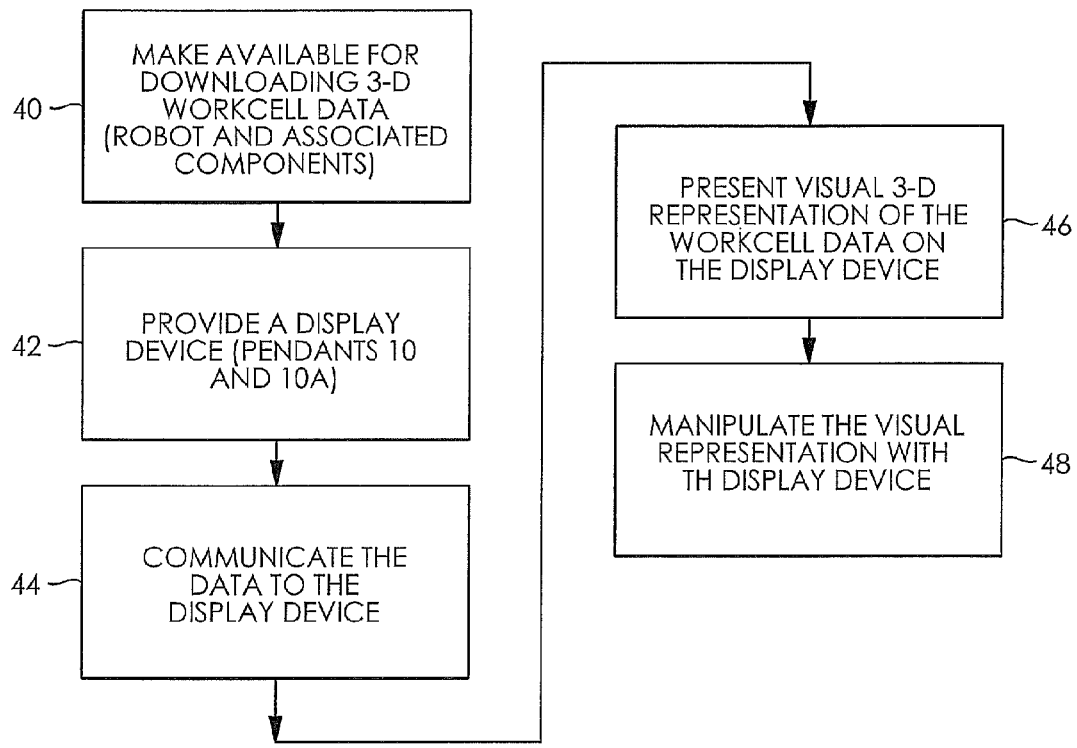
FIG. 3 is a flow diagram of the method according to the present invention.

The method according to the invention for displaying a three-dimensional workcell data (e.g. a 3-D rendering of a workcell data) includes a step wherein the workcell data is provided. As shown in the flow diagram of FIG. 3, models of a machine (e.g. a robot) and associated components are made available for downloading from the robot controller using a communications protocol to the hand-held display device (pendants 10 and 10a) in a first step 40. In a second step 42, the display device is provided and is placed in data communication with the source of the workcell data. In a third step 44, the workcell data is communicated to the display device. In a fourth step 46, the display device presents a visual representation (i.e. visual output) of the workcell data. As a non-limiting example, the display device allows a user to preview a movement of the machine graphically by engaging the means for, manipulating (e.g. pressing a movement key), wherein the display device displays the movement graphically before actually moving the mechanism. As a further non-limiting example, the visual output presented on the display device can be configured to indicate a collision object (e.g. safety wall) and to project a collision of the physical robot with the collision object, prior to executing a movement.

In a fifth step 48, the visual output presented by the display device is manipulated. In certain embodiments, a user can select visual points singularly or as a group, wherein the visual points can be related to a programmed sequence. As a non-limiting example, the user can move and configure the visual points in a three-dimensional space. As a further non-limiting example, the user can rotate, zoom, tilt, and pan a particular view. It is understood that the user can manipulate the visual output in any manner available through the underlying software.

Quick access to graphical functions can be provided through a hard key of the display device. For example, access to many graphical functions can be provided through a "shift" function. When this graphics key is pressed in combination with a hard key provided for the related text function the appropriate graphical display is immediately viewable. Also available are soft keys generated on the display.

Figure 4:
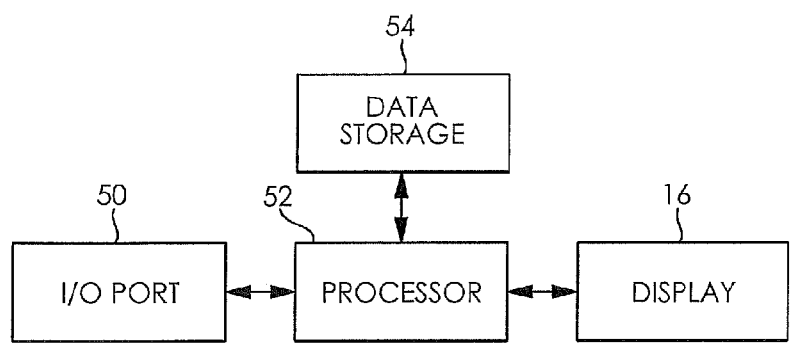
FIG. 4 is a schematic block diagram of a system for displaying 3-D workcell data according to an embodiment of the invention.

FIG. 4 is a schematic block diagram of a system for displaying 3-D workcell data according to an embodiment of the invention. The pendant 10 (and the pendant 10a) includes at least one I/O port 50 for communication with the controller 12 or any other source of three-dimensional workcell data. The input/output port 50 is connected to a processor 52 that runs a software operating program providing the above-described functions of the pendant. The processor 52 is connected to a data storage device 54 that stores the operating program and the received workcell data. The processor 52 is connected to the display 16 for generating a visualization of the 3-D images and related information and receiving signals from the soft keys 24b shown in FIG. 2.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for displaying three-dimensional workcell data comprising the steps of:
providing from a data source 3-D workcell data representing a model of a robot and associated components in a workcell;
providing a hand-held display device and placing the display device in data communication with the data source;
communicating the workcell data from the data source to the display device;
generating a 3-D visual representation of the workcell data on the display device, including displaying the visual representation of
a position of the robot based on a value of a program or a non-program representation of robot position within a software program for controlling the robot,
an aggregate space occupied by the robot through movement of an associated part of the robot about at least one axis of rotation of the robot throughout execution of at least a portion of the software program, and
an interference visualization image of the aggregate space that includes an image of a plane transverse to the axis of rotation; and
operating the display device to manipulate the visual representation.

2. The method according to claim 1 wherein the display device has jog keys and including displaying a direction the robot will take if moved in response to actuation of the jog keys.

3. The method according to claim 1 including plotting process information in conjunction with TCP trace of the software program.

4. The method according to claim 1 including storing data from a series of the robot positions and associated secondary information and replaying a progression of the robot positions with the associated secondary information as the visual representation.

5. The method according to claim 1 including using color and transparency to differentiate various elements in the visual representation.

6. The method according to claim 1 including incorporating in the visual representation an area not visible to a user of the hand-held display device for restricting or limiting travel of the robot during an operation of the robot.

7. The method according to claim 1 including incorporating in the visual representation video data from a view point of a camera in the workcell.

8. The method according to claim 1 including showing movement of elements of the robot in the visual representation.

9. The method according to claim 1 including selecting a 3-D element of the visual display and automatically indicating or displaying a corresponding 2-D item on the display device.

10. The method according to claim 1 including changing the visual representation to provide different user viewpoints.

11. The method according to claim 1 including operating the display device to display at least one of a menu and robot text data in a semi-transparent window with 3-D elements visible below and manipulating the transparency from invisible to opaque.

12. The method according to claim 1 including displaying multiple 3-D views in the visual representation as a split screen or a picture-in-picture.

13. The method according to claim 1 including presenting the visual representation as separate images for each eye of a user wherein the separate images are different for a 3-D movie effect or are the same.

14. A hand-held pendant for communicating with a robot controller comprising:
 a display having a resolution high enough to show 3-D graphical images;
 an input/output port for receiving from a data source 3-D workcell data representing a model of a robot and associated components in a workcell;
 a data storage device for storing the 3-D workcell data and a pendant operating program; and
 a processor connected to the display, the input/output port and the data storage device for running the operating program to generate a 3-D visual representation of the 3-D workcell data on the display and being responsive to user input to manipulate the visual representation, the visual representation including
  a position of the robot based on a value of a program or a non-program representation of robot position within a software program for controlling the robot,
  an aggregate space occupied by the robot through movement of an associated part of the robot about at least one axis of rotation of the robot throughout execution of at least the portion of the software program, and
  an interference visualization image of the aggregate space that includes an image of a plane transverse to the axis of rotation.

15. The pendant according to claim 14 wherein the data source is the robot controller, the 3-D workcell data is related to a robot operating program being run by the controller and visual representation includes graphical images of the robot moving in response to instructions in the robot operating program.

16. A method for displaying three-dimensional workcell data comprising the steps of:
 providing from a data source 3-D workcell data representing a model of a machine and associated components in a workcell;
 providing a hand-held display device and placing the display device in data communication with the data source;
 communicating the workcell data from the data source to the display device;
 selecting a 2-D item on the display device and automatically indicating or displaying a corresponding 3-D element on the visual display of the display device;
 generating a 3-D visual representation of the workcell data on the display device; and
 operating the display device to manipulate the visual representation.

17. A method for displaying three-dimensional workcell data comprising the steps of:
 providing from a data source 3-D workcell data representing a model of a machine and associated components in a workcell;
 providing a hand-held display device and placing the display device in data communication with the data source;
 communicating the workcell data from the data source to the display device;
 generating a 3-D visual representation of the workcell data on the display device;
 operating the display device to manipulate the visual representation; and
 using the display device to create an adjusted view of the machine, associating the adjusted view with an original scene of the machine, and automatically recording the adjusted view with the original scene.

18. A method for displaying three-dimensional workcell data comprising the steps of:
 providing from a data source 3-D workcell data representing a model of a machine and associated components in a workcell;
 providing a hand-held display device and placing the display device in data communication with the data source;
 communicating the workcell data from the data source to the display device;
 generating a 3-D visual representation of the workcell data on the display device;
 operating the display device to manipulate the visual representation; and
 using the display device to preview a movement of the machine by engaging a movement key of the display device, wherein the display device displays the movement graphically prior to actual movement of the machine.

* * * * *